US007327359B2

(12) United States Patent
Nagayama et al.

(10) Patent No.: US 7,327,359 B2
(45) Date of Patent: Feb. 5, 2008

(54) COMPUTER-READABLE RECORDING MEDIUM RECORDING IMAGE DISPLAY CONTROL PROGRAM, AND IMAGE DISPLAY CONTROL DEVICE AND METHOD (75) Inventors: Kentaro Nagayama, Osaka (JP); Masahiro Kiyomoto, Yawata (JP)

(73) Assignee: Konami Corporation, Tokyo (JP)

( * ) Notice: Subject to any disclaimer, the term of this patent is extended or adjusted under 35 U.S.C. 154(b) by 1570 days.

(21) Appl. No.: 09/994,356

(22) Filed: Nov. 26, 2001

(65) Prior Publication Data
US 2002/0063776 A1 May 30, 2002

(51) Int. Cl.
G06T 15/00 (2006.01)
(52) U.S. Cl. ............... 345/419; 345/427; 345/582
(58) Field of Classification Search ........... 345/419, 345/423, 427, 428, 440, 582
See application file for complete search history.

(56) References Cited

U.S. PATENT DOCUMENTS 5,973,699 A 10/1999 Kent .................... 345/419
7,034,825 B2 * 4/2006 Stowe et al. ............ 345/423

FOREIGN PATENT DOCUMENTS

| EP | 0 817 129 | 1/1998 |
| JP | 5-27779 | 4/1993 |
| JP | 7-220055 | 8/1995 |
| JP | 10-172006 | 6/1998 |

OTHER PUBLICATIONS

Zyda M J et al: "NPSNET: Constructing a 3D Virtual World" Proceedings of the Symposium on Interactive 3D Graphics. Cambridge, MA., Mar. 29-Apr. 1, 1992, New York, ACM, US, Mar. 29, 1992, pp. 147-156, XP000308189 * the whole document *.
Levinson D S: "Creating 3D Real Time Video Games" Computer Graphics, ACM, US, vol. 30, No. 1, Feb. 1, 1996, pp. 25-26, XP000554360 ISSN: 0097-8930 * the whole document *.

* cited by examiner

Primary Examiner—Phu K. Nguyen
(74) Attorney, Agent, or Firm—Jordan and Hamburg LLP (57) ABSTRACT To achieve a display across a broad display area, without losing polygons projected towards the foreground of the screen, in particular. An image display control device divides a virtual three-dimensional space consisting of a plurality of three-dimensional models into a grid shape, stores the image data for the three-dimensional models in each block thus divided in a display memory 8, and stores the three-dimensional models in the field of view of a virtual camera positioned in the virtual three-dimensional space in a display memory of a RAM 8, whereupon the three-dimensional models are displayed on a monitor 2. The display control device has a block identifying section 112 for identifying the block where the virtual camera is positioned; a block selecting section 113 for selecting five mutually adjoining blocks from the blocks adjoining the periphery of the identified block, on the basis of the position information and line of sight direction information for the virtual camera; and an image processor 12 for transferring the image data for the three-dimensional models in the identified block and selected blocks to the display area of the RAM 8.

11 Claims, 10 Drawing Sheets

SELECTED BLOCK

UNSELECTED BLOCK

UNSELECTED BLOCK    SELECTED BLOCK

COMPUTER-READABLE RECORDING MEDIUM RECORDING IMAGE DISPLAY CONTROL PROGRAM, AND IMAGE DISPLAY CONTROL DEVICE AND METHOD

BACKGROUND OF THE INVENTION

1. Field of the Invention

The present invention relates to an image display control technology for controlling and displaying a virtual space within the field of view of a virtual camera in a virtual three-dimensional space.

2. Description of the Related Art

In the prior art, video games wherein a user controls a sports player forming a game character are commonly used. Video games of this kind for playing outdoors sports, in particular, are known, wherein natural objects, and the like, existing outdoors are simulated on the monitor game screen and displayed as three-dimensional models.

In conventional games of this kind, when displaying three-dimensional models of natural objects, and the like, on a screen, it is possible to display all such models in one operation, since they are displayed in a relatively narrow region.

However, if a broad region is to be displayed, then the amount of information involved becomes too large, and it becomes very difficult to display all the models in one operation, taking consideration of the frame cycle of the monitor.

In order to resolve this problem, the present invention seeks to provided a computer-readable recording medium recording an image display control program, and an image display control device and method, whereby the display area in the field of view of a virtual camera (view volume), as well as peripheral blocks thereof which may become part of the display area, can be selected efficiently, by dividing a large region into a grid shape, and storing image data of three-dimensional models for each respective block thus divided.

SUMMARY OF THE INVENTION

In order to achieve the above object, one aspect of the present invention relates to a computer-readable recording medium recording an image display control program for performing control whereby a virtual three-dimensional space consisting of a plurality of three-dimensional models is divided into a grid shape, and the three-dimensional models in the field of view of a virtual camera positioned in the virtual three-dimensional space are transferred to a display memory, with respect to image data of three-dimensional models stored for each block thus divided, and are then displayed on a monitor, wherein the image display control program comprising the steps of: identifying said block where said virtual camera is positioned; selecting either three or five mutually adjoining blocks from the blocks adjoining the periphery of the identified block on the basis of at least one of the position information or line of sight direction information for said virtual camera; reading out the image data for the three-dimensional models in said identified block and selected blocks; and transferring said image data to a display memory.

According to the aforementioned invention, it is possible to display a large region in a virtual three-dimensional space, without loss of image within the display region, especially in the proximity of the virtual camera.

These and other objects, features, and advantages of the present invention will become more apparent upon reading of the following detailed description along with the accompanied drawings.

BRIEF DESCRIPTION OF THE DRAWINGS

FIG. 5 illustrates a method for selecting blocks according to the line of sight direction f, in a first selection method.

FIG. 7 illustrates a method for selecting blocks according to the camera position, in a second selection method.

FIG. 9 illustrates a method for selecting blocks according to the camera position, in a third selection method.

DESCRIPTION OF THE PREFERRED EMBODIMENTS

Figure 1:
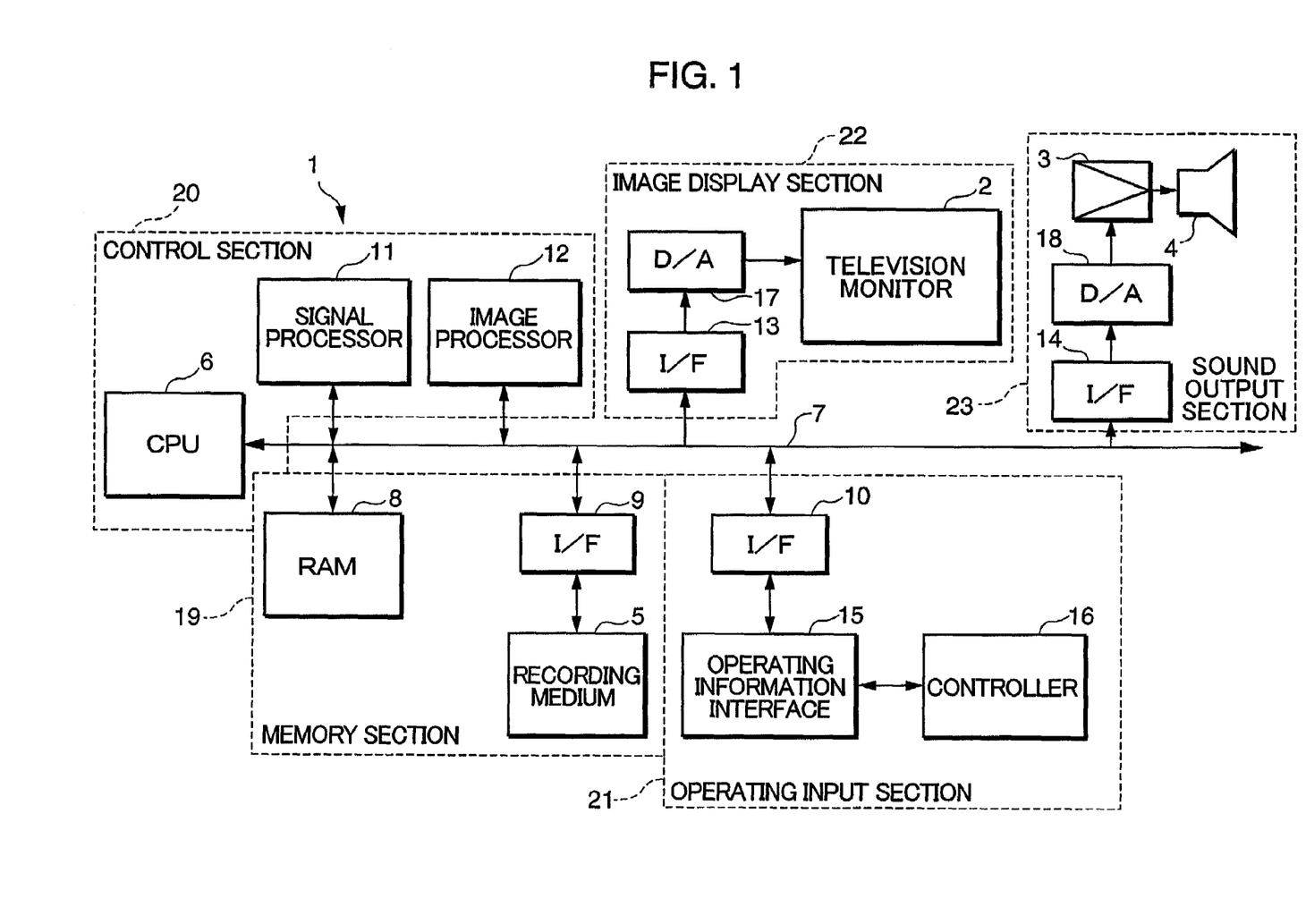
FIG. 1 is a block diagram showing one embodiment of a video game device to which the present invention is applied.

FIG. 1 is a block composition diagram showing one embodiment of a video game device to which the present invention is applied.

This game device 1 comprises: a game device main unit; a video monitor 2 for outputting game images; an amplifying circuit 3 and speaker 4 for outputting sound effects, or the like, in the game; and a recording medium 5 whereon game data comprising images, sound sources and program data is recorded. The recording medium 5 may be, for example, a CD-ROM, DVD-ROM, ROM cassette, flexible disk, or the like, on which the aforementioned game data and operating system program data are stored, and depending on the embodiment of the game device 1, it may also be an internal ROM, or the like.

In the game device main unit, a bus 7 comprising an address bus, data bus and control bus is connected to a CPU 6, and furthermore, a RAM 8, interface circuit 9, interface circuit 10, signal processor 11, image processor 12, interface circuit 13, and interface circuit 14 are respectively connected to the bus 7. A controller 16 is connected to the interface circuit 10 via an operating information interface circuit 15, a D/A converter 17 is connected to the interface circuit 13, and a D/A converter 18 is connected to the interface circuit 14.

A memory section 19 is constituted by the RAM 8, interface circuit 9 and recording medium 5; a control section 20 for controlling the development of the game is constituted by the CPU 6, signal processor 11 and image processor 12; an operation input section 21 is constituted by the interface circuit 10, operating information interface circuit 15 and controller 16; an image display section 22 is constituted by the video monitor 2, interface circuit 13 and D/A converter 17; and a sound output section 23 is constituted by the amplifying circuit 3, speaker 4, interface circuit 14 and D/A converter 18.

The signal processor 11 principally carries out calculations of a virtual camera position, and the like, in a virtual three-dimensional space, calculations to convert the position in the three-dimensional space to a position in a two-dimensional space, light source calculation processing, and various sound source data readout and synthesis processing.

The image processor 12 performs processing for positioning polygons constituting an image to be drawn in the display area of the RAM 8, and rendering processing, such as texture mapping onto these polygons, on the basis of the images to be displayed being copied into the display memory, in other words, on the basis of the calculation results from the signal processor 11.

The controller 16 comprises various buttons and joysticks, and serves to supply game content selections, start instructions, and also action instructions and direction instructions, and the like, relating to the main character.

The aforementioned game device 1 may be embodied in different modes depending on the application thereof. In other words, if the game device 1 is made for domestic use, the video monitor 2, amplifying circuit 3 and speaker 4 are constituted separately from the game device main unit. Moreover, if the game device 1 is made from commercial use, then the constituent element illustrated in FIG. 1 are all accommodated inside a single case forming an integral unit.

Furthermore, if the game device 1 is constituted on the basis of a personal computer or work station, then the video monitor 2 will correspond to the display of the computer, the image processor 12 will correspond to a portion of the game program data recorded in the recording medium 5 or to hardware on an expansion board fitted to an expansion slot of the computer, and the interface circuit 9, 10, 13, 14, D/A converter 17, 18, and the operating information interface circuit 15 will correspond to hardware on an expansion board fitted to an expansion slot of the computer. Moreover, the RAM 8 will correspond to respective areas of the main memory or expanded memory of the computer.

This embodiment relates to an example where the game device 1 is made for domestic use.

Firstly, the general operation of the game device 1 is described. When power is supplied to the game device 1 by turning the power switch (not illustrated) on, the CPU 6 reads out image, sound source and game program data from the recording medium 5, on the basis of an operating system stored in the recording medium 5. All or a portion of the image, sound source and game program data read out is stored in the RAM 8.

Thereupon, the CPU 6 develops the game on the basis of the game program data stored in the RAM 8, and the instruction contents input by the game player via the controller 16. In other words, the CPU 6 generates task commands for drawing and outputting sounds, and the like, appropriately, on the basis of the instruction contents supplied by the game player via the controller 16.

On the basis of the aforementioned commands, the signal processor 11 calculates a virtual camera position, and the like, in a three-dimensional space (naturally, the same also applies to a two-dimensional space), calculates a light source, and reads out and synthesizes various sound source data.

The image processor 12 then performs write processing, and the like, for the image data that is to be drawn to the display area of the RAM 8, on the basis of the aforementioned calculational processing. The image data written to the RAM 8 is supplied via an interface circuit 13 to a D/A converter 17, where it is converted to an analogue video signal and supplied to the video monitor 2, which displays the data as an image on the screen.

An image data section 81 divides the virtual three-dimensional space consisting of a plurality of three-dimensional models into a grid shape, and stores image data for the three-dimensional models by assigning an ID containing identification information for each of the respective blocks thus created.

Figure 2:
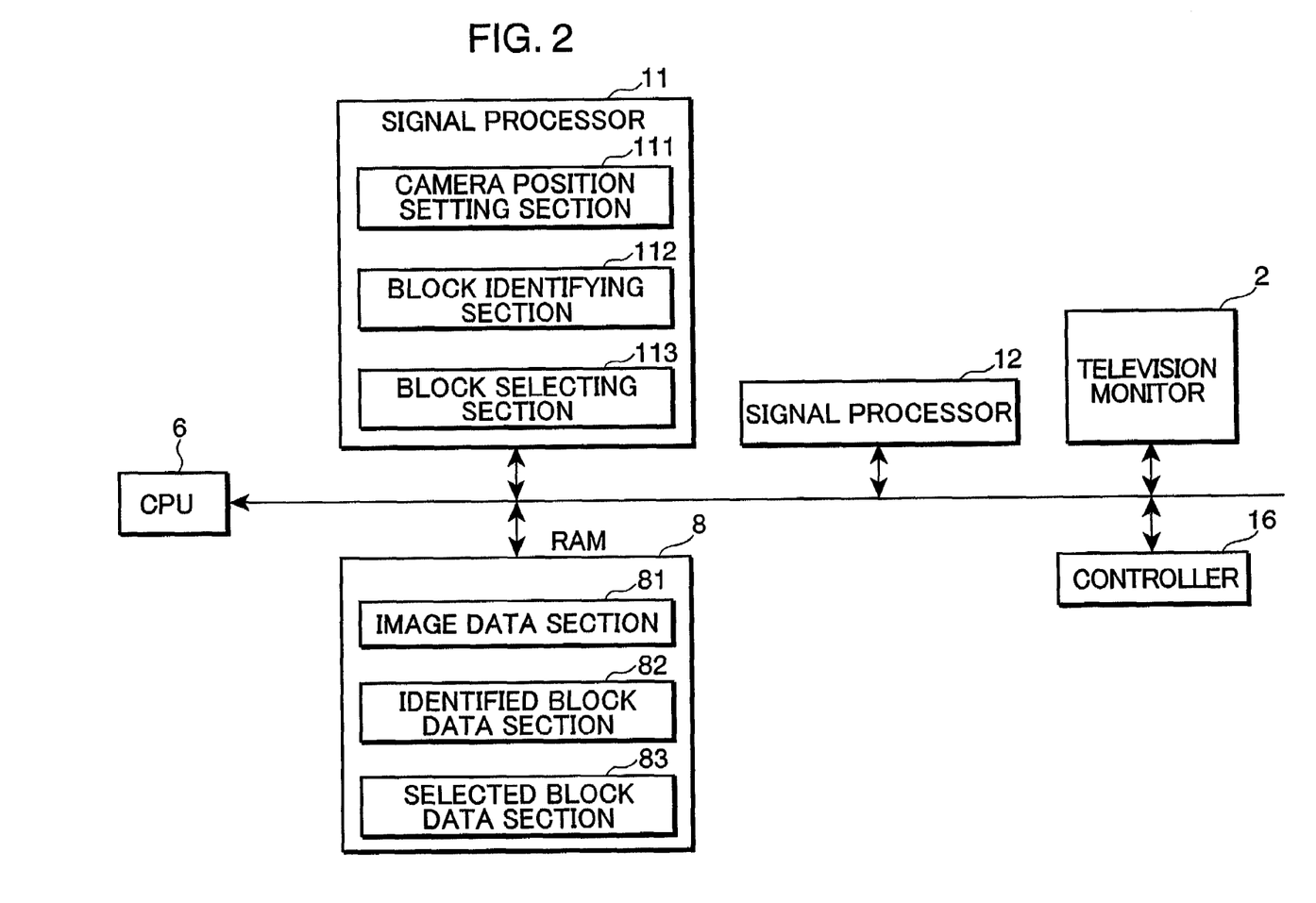
FIG. 2 is a block diagram showing the principal parts of a display control device.

FIG. 2 is a block diagram showing the principal portion of an image control device. The signal processor 11 comprises a camera position setting section 111 for determining a position c and line of sight direction f for a virtual camera, on the basis of the game program and operating information from the controller 16, a block identifying section 112 for identifying the block in which the virtual camera is positioned, and a block selecting section 113 for selecting blocks containing image data that is to be copied to the display area of the RAM 8 as display candidate data, on the basis of the identified block. The image processor 12 transfers image data for the three-dimensional models contained in the identified and selected blocks to the display area of the RAM 8.

The block identifying section 112 identifies the block where the virtual camera c is positioned on the basis of the position data form the camera position setting section 111, and stores the ID of the identified block in an identified block data section 82.

The block selecting section 113 selects blocks to be displayed from the adjoining blocks, and stores the ID thereof in the selected block data section 83. Moreover, in the blocks not selected above, intersections between those blocks which are proximate to the virtual camera c and the view volume of the camera are investigated, and the block selecting section 113 stores the ID information for any blocks where such an intersection occurs in the selected block data section 83.

The RAM 8 comprises an image data section 81 wherein the virtual three-dimensional space is divided into a grid shape and the three-dimensional models in each block are recorded by respectively assigning an ID thereto, an identifying block data section 82 storing ID information for blocks identified by the block identifying section 112, and a selected block data section 83 storing ID information for blocks selected by the block selecting section 113.

Figure 3:
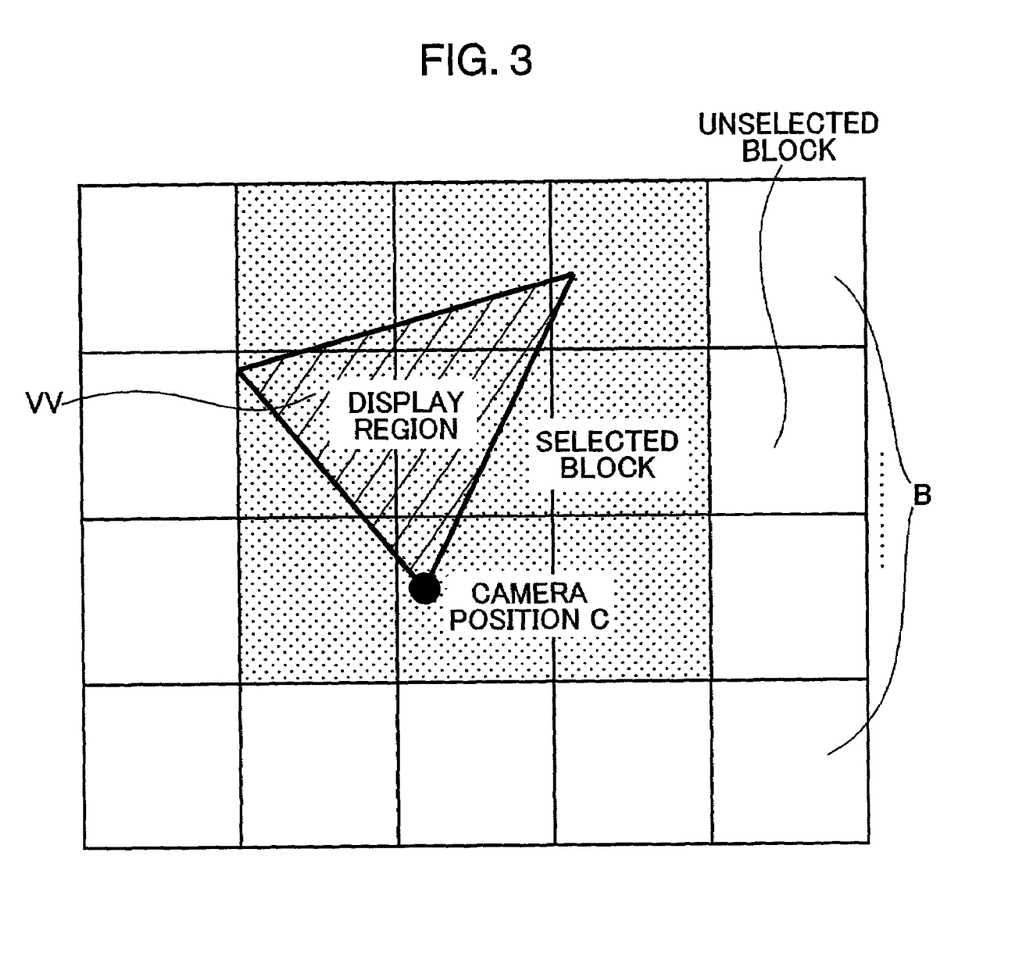
FIG. 3 is a general view showing a block identifying and selecting method.
Figure 4:
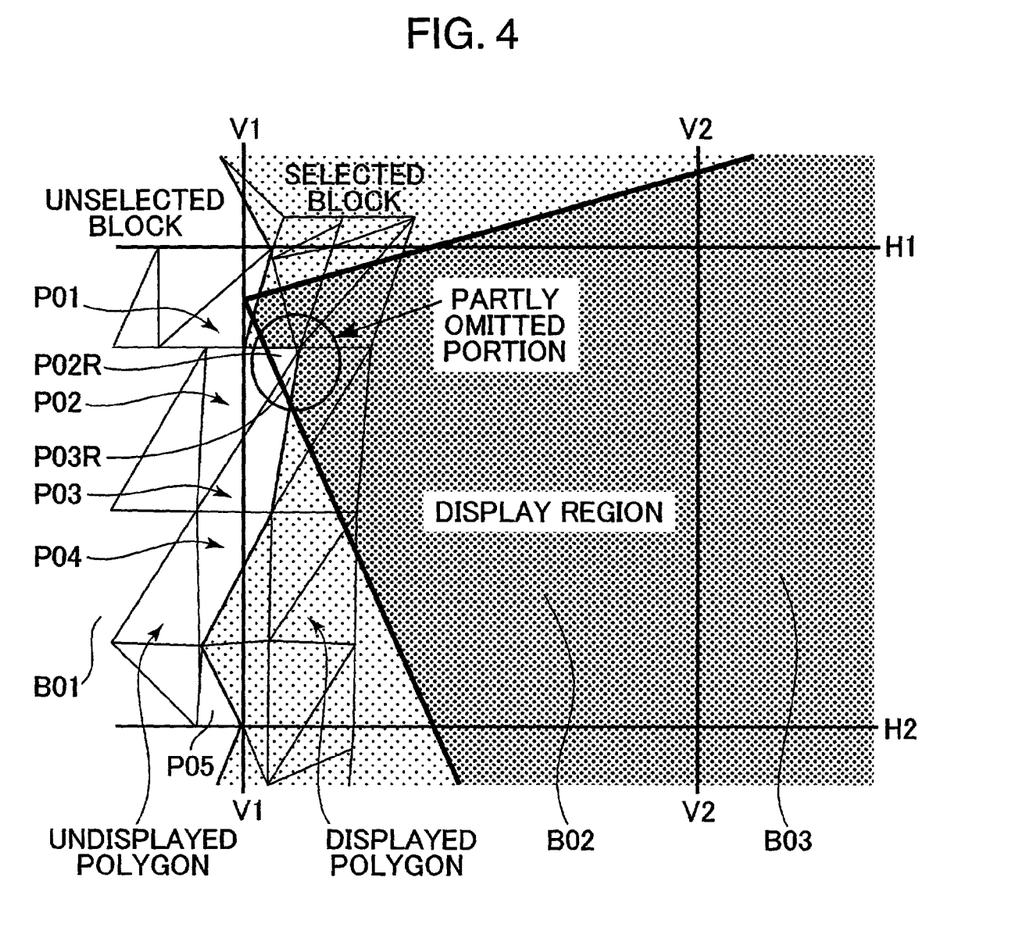
FIG. 4 is an enlarged view of block boundaries.
Figure 5A:
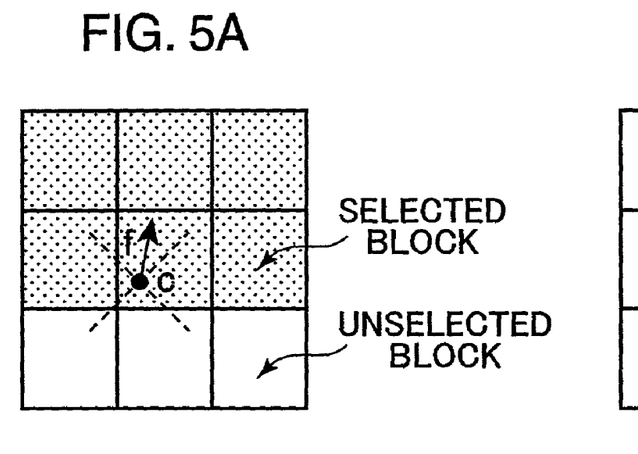
FIG. 5A illustrates a state where a forward direction is selected.
Figure 5B:
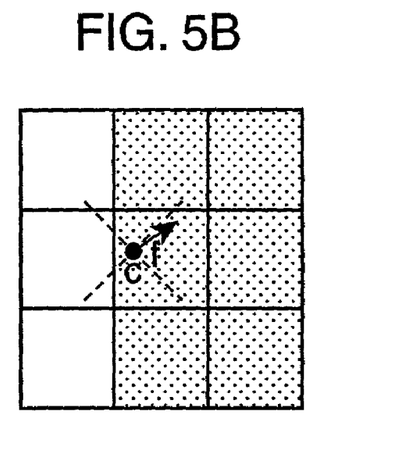
FIG. 5B illustrates a state where a rightward direction is selected.
Figure 5C:
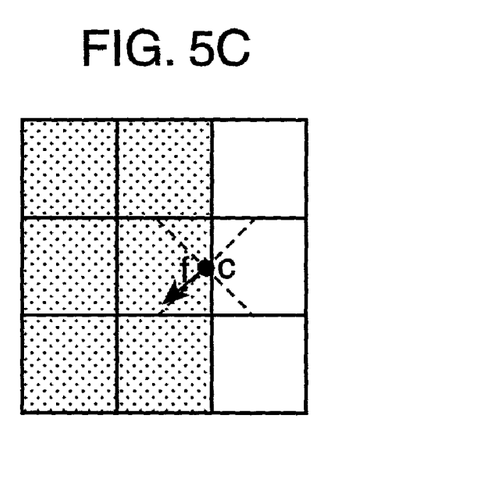
FIG. 5C illustrates a state where a leftward direction is selected.
Figure 5D:
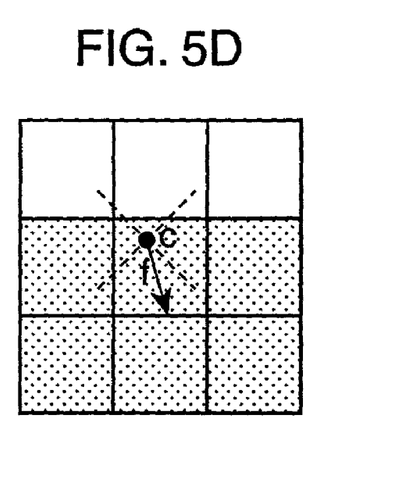
FIG. 5D illustrates a state where a rearward direction is selected.

Here, the image display control method of the present invention will be described. FIG. 3 is a general view illustrating a block identifying and selecting method, and FIG. 4 is an enlarged view of block boundaries, wherein the vertical and horizontal line indicate the block boundaries. As shown in FIG. 3, the whole region is divided globally into a grid shape. Blocks forming display candidates are selecting by investigating whether or not the view volume (also referred to as display region) W indicating the line of sight of the virtual camera c intersects with each block B, and then choosing those blocks B intersecting with the view volume (display region) W which are located proximately to the virtual camera c (dotted area in FIG. 3 and FIG. 4). However, since it is not readily possible to fit all the polygons (usually in a form of triangle such as P01, P02, . . . ,P04, and P05) accurately within blocks (i.e., B01, B02, . . . ), then if blocks are selected by only taking their intersection with the view volume into account, and a portion of a polygon in a block that has not been selected (unselected block) is contained in a display candidate block as illustrated in FIG. 4, then this portion of the image will be omitted from the display screen, an occurrence which is particularly notable in the case of blocks situated proximately to the virtual camera c. For example, the polygons P01, P02, P03, P04, and P05 are set to belong to a block B01 formed by two horizontal lines H1 and H2 and a right vertical line V1 (left vertical line is not shown in FIG. 4). Furthermore, the block B02 is formed by two horizontal lines H1 and H2 and two vertical lines V1 and V2 as shown in FIG. 4 and the block B02 is assumed to be a selected block. Then let us closely look at the polygon P02, for example, the right part of the polygon P02 is within the selected block B02 and the further right corner P02R of the polygon P02 lies in the left top corner of the display view volume W, this polygon P02, however, is not treated as a polygon to be displayed because this polygon was set to belong to the non-selected block B01. Similarly, the same thing will happen to the polygon P03 for the same reason. As a result, the right corners of polygons P02R and P03R are to be omitted from the view volume W.

Therefore, in order to prevent such image omissions, the following selection method is employed for blocks B that are proximate to the virtual camera c, in particular.

(First Selection Method)

In the first selection method, blocks are selected by taking consideration of the line of sight direction f of the virtual camera c only.

FIG. 5 illustrates a method for selecting blocks according to the line of sight direction f, in this first selection method; FIG. 5A illustrates a state where a forward direction is selected; FIG. 5B illustrates a state where a rightward direction is selected; FIG. 5C illustrates a state where a leftward direction is selected; and FIG. 5D illustrates a state where a rearward direction is selected. One of four directions (forward, rearward, rightward, leftward) is determined from the line of sight direction f of the virtual camera c, and in the determined direction containing either side of the identified block, a total of five adjoining blocks are selected to form a rectangular shape containing the block where the virtual camera c is positioned.

Figure 6:
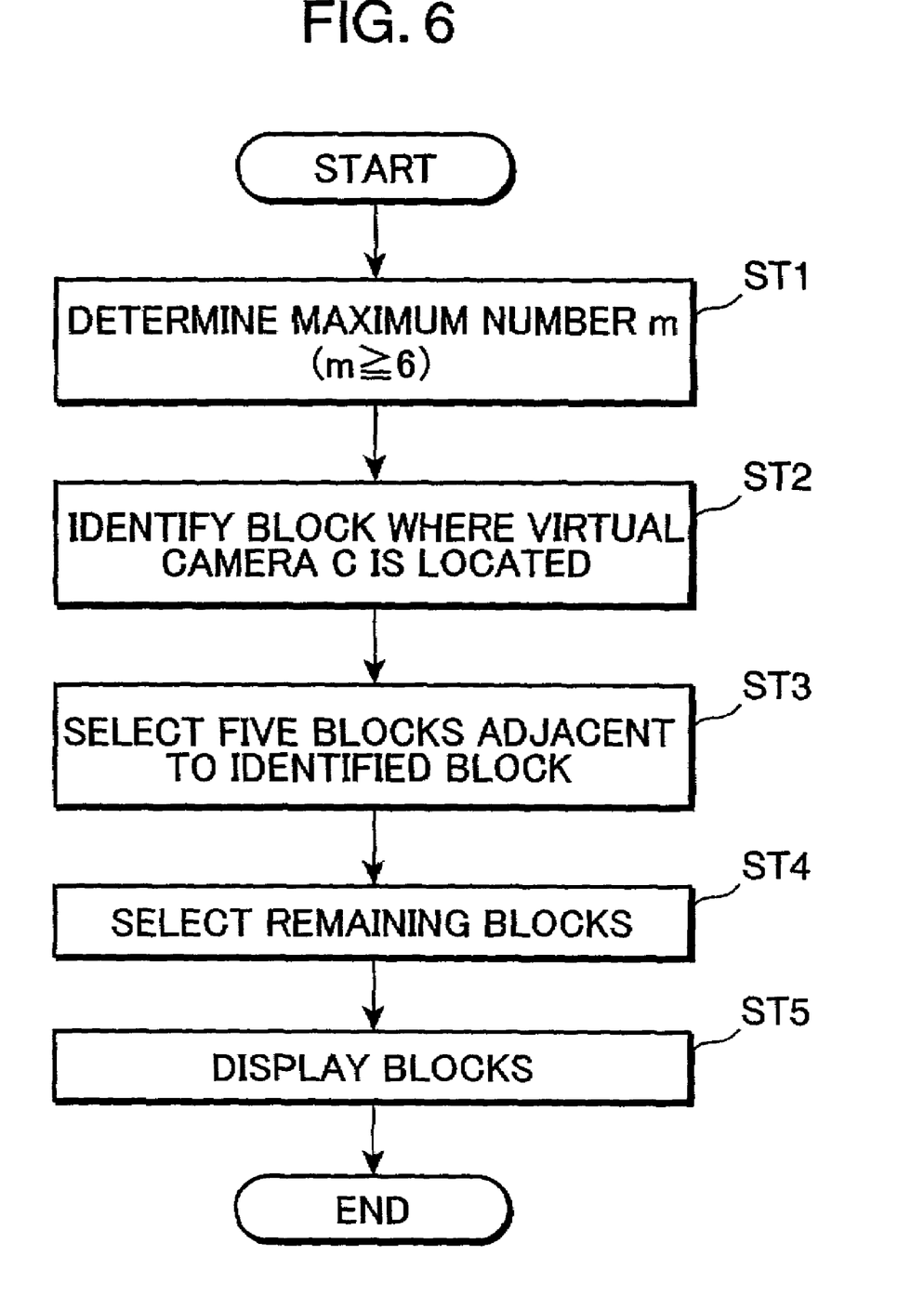
FIG. 6 is a flowchart showing a first selection method in an image display control device.
Figure 7A:
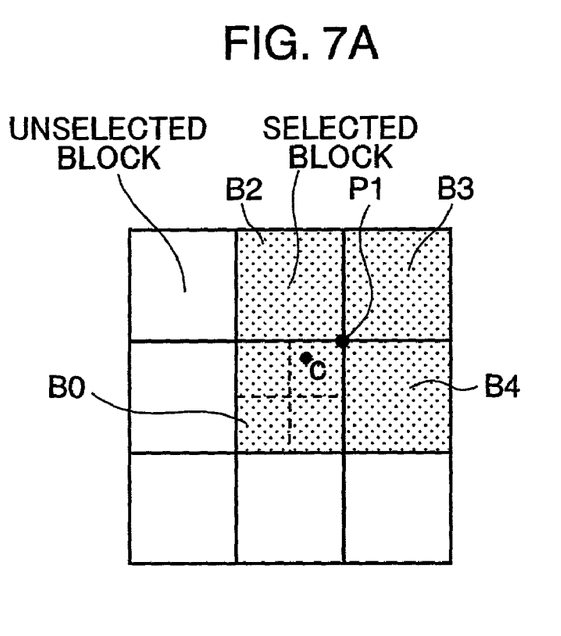
FIG. 7A illustrates a state where a forward direction is selected.
Figure 7B:
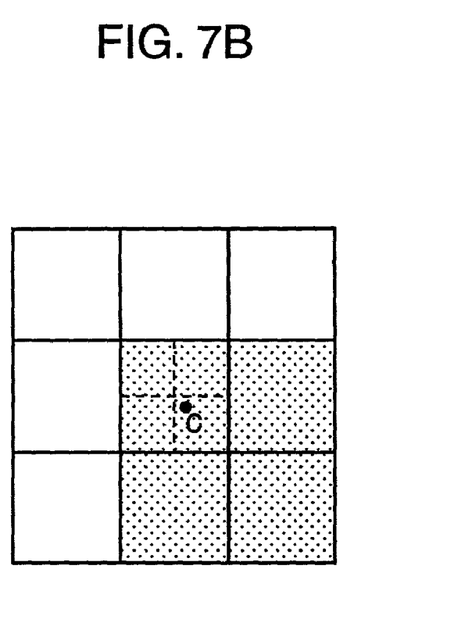
FIG. 7B illustrates a state where a rightward direction is selected.
Figure 7C:
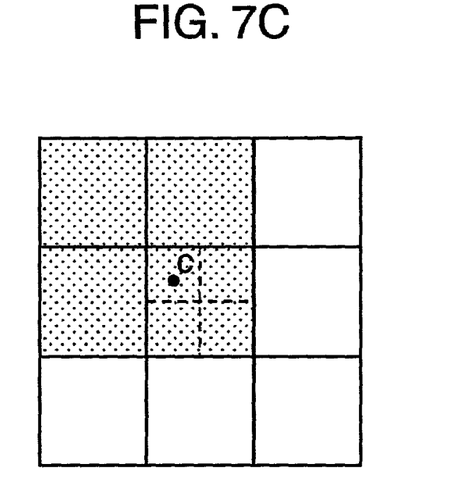
FIG. 7C illustrates a state where a leftward direction is selected.
Figure 7D:
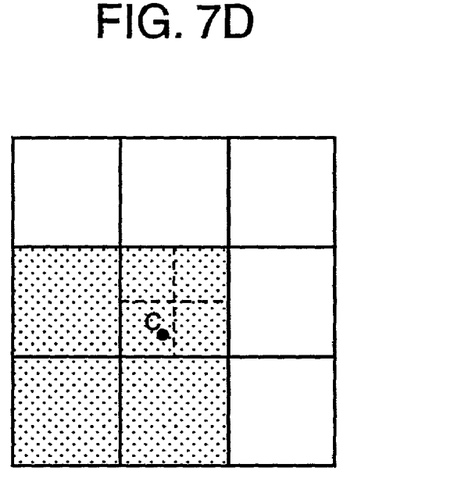
FIG. 7D illustrates a state where a rearward direction is selected.

FIG. 6 is a flowchart of the first selection method.

Firstly, the maximum number of blocks (m) identified and selected is decided (m≧6) (ST1). This is set in order to limit the blocks which can be displayed according to the display properties, and since the number of identified blocks is one and the number of blocks selected by step ST3 described hereinafter is five, then m is set to m≧6.

Next, the block identifying section 112 identifies the block where the virtual camera c is positioned on the basis of the position data from the camera position setting section 111, and it stores the ID of the identified block in the identified block data section 82 (ST2). Next, the block selecting section 113 selects five blocks of the eight blocks adjoining the identified block, on the basis of the line of sight direction data from the camera position setting section 111, to form a rectangular shape containing the block identified at step ST2, and it stores the IDs of these blocks in the selected block data section 83 (ST3). The block selecting section 113 then determines intersection points between the remaining blocks and the view volume, starting from the blocks nearest to the virtual camera c, and it stores a block in the selected block data section 83 if it has such an intersection, repeating this operating until the number of IDs of the identified and selected blocks reaches m (ST4). The image processor 12 then reads out the blocks corresponding to the block IDs stored in the identified block data section 82 and selected block data section 83, from the image data section 84, and transfers these blocks to the display area of the RAM 8, from which they are displayed on the monitor (ST5).

(Second Selection Method)

In the second selection method, blocks are selected from identified blocks on the basis of the position of the virtual camera c.

FIG. 7 illustrates a method for selecting blocks according to the camera position, in a second selection method: FIG. 7A illustrates a state where a forward direction is selected; FIG. 7B illustrates a state where a rightward direction is selected; FIG. 7C illustrates a state where a leftward direction is selected; and FIG. 7D illustrates a state where a rearward direction is selected. An identified block is divided equally into four areas, vertically and horizontally, and three blocks contacting that corner section of the four corner sections comprising the divided area of identified block which contains the virtual camera c are selected, such that the selected blocks form a square shape including the block where the virtual camera c is positioned. For example, in 7A, the virtual camera c is positioned in the front right divided area of the identified block B0, and consequently, point P1 of the identified block B0 is determined as the corner section and the blocks B2, B3, B4 adjoining this are selected.

Figure 8:
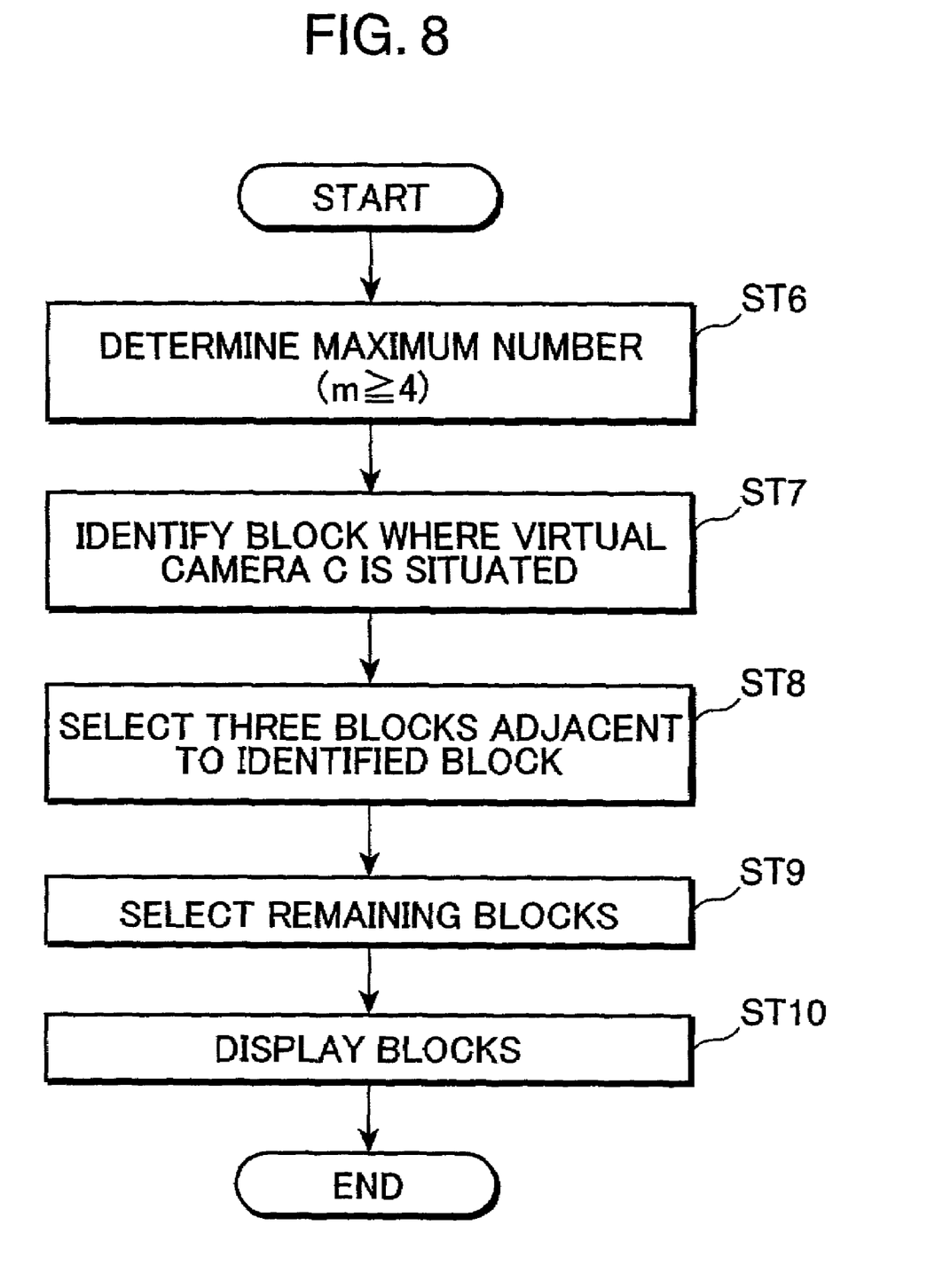
FIG. 8 is a flowchart showing a second selection method in an image display control device.
Figure 9A:
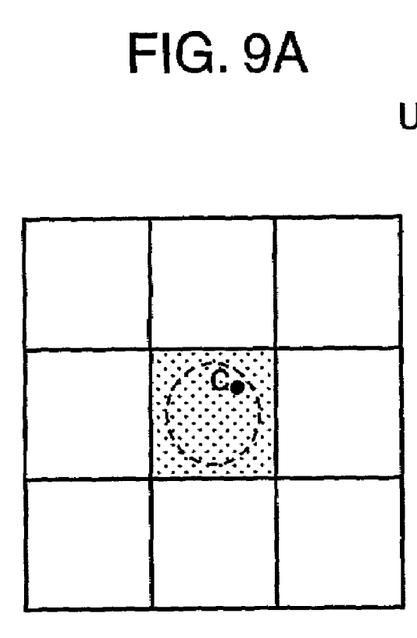
FIG. 9A illustrates a state within a prescribed distance.
Figure 9B:
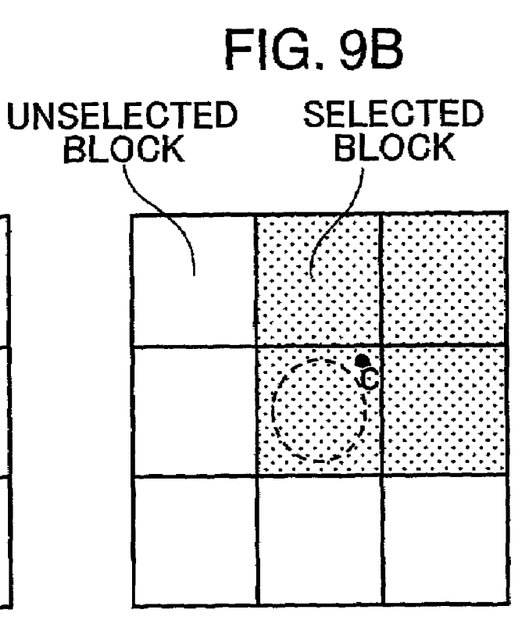
FIG. 9B illustrates a state outside a prescribed distance where a front right direction is selected.
Figure 9C:
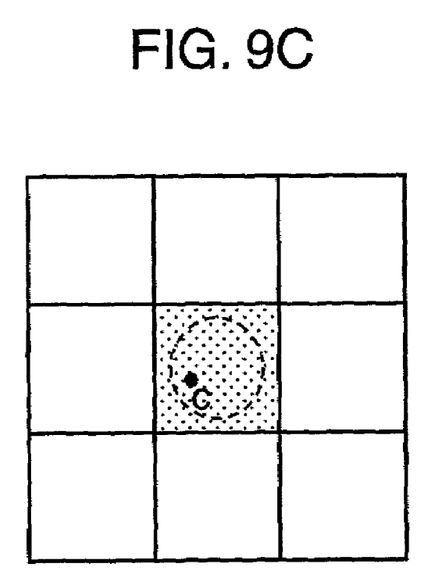
FIG. 9C illustrates a state within a prescribed distance.
Figure 9D:
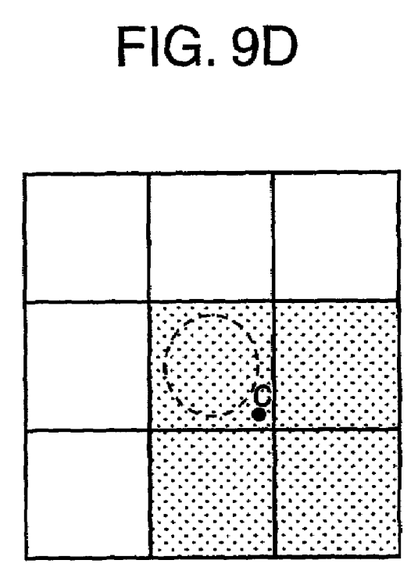
FIG. 9D illustrates a state outside a prescribed distance where a rear right direction is selected.

FIG. 8 is a flowchart of the second implementation method.

Firstly, the maximum number of identified and selected blocks m is decided (m≧4) (ST6). In this case, the number of blocks identified and selected at step ST8 is four, and hence m≧4. Next, the block identifying section 112 identifies the block where the virtual camera c is positioned, on the basis of position data from the camera position setting section 111, and it stores the ID of the identified block in the identified block data section 82 (ST7). Next, the block selecting section 113 selects three of the eight blocks adjoining the identified block, on the basis of position data from the camera position setting section 111, so as to form a square shape containing the block identified at step ST7, and it stores the corresponding block IDs in the selected block data section 83 (ST8). The block selecting section 113 then determines intersection points between the remaining blocks and the view volume, starting from the blocks nearest to the virtual camera c, and it stores a block in the selected block data section 83 if it has such an intersection, repeating this operating until the number of IDs of the identified and selected blocks reaches m (ST9). The image processor 12 then reads out the blocks corresponding to the block IDs stored in the identified block data section 82 and selected block data section 83, from the image data section 84, and transfers these blocks to the display area of the RAM 8, from which they are displayed on the monitor (ST10).

(Third Selection Method)

In the third selection method, blocks are selected on the basis of the distance from the virtual camera c to the centre of the block containing the virtual camera c.

FIG. 9 illustrates a method for selecting blocks according to the camera position, in a third selection method: FIG. 9A illustrates a state within a prescribed distance; FIG. 9B illustrates a state outside a prescribed distance where a front right direction is selected; FIG. 9C illustrates a state within a prescribed distance; and FIG. 9D illustrates a state outside a prescribed distance where a rear right direction is selected. If the virtual camera c is within a prescribed distance from the centre of the identified block, then no adjoining blocks are selected, and the intersections between the view volume and the blocks are investigated and corresponding blocks are stored in the selected block data section 83. Conversely, if the virtual camera c is beyond the prescribed distance, then blocks are selected according to the second selection method.

Figure 10:
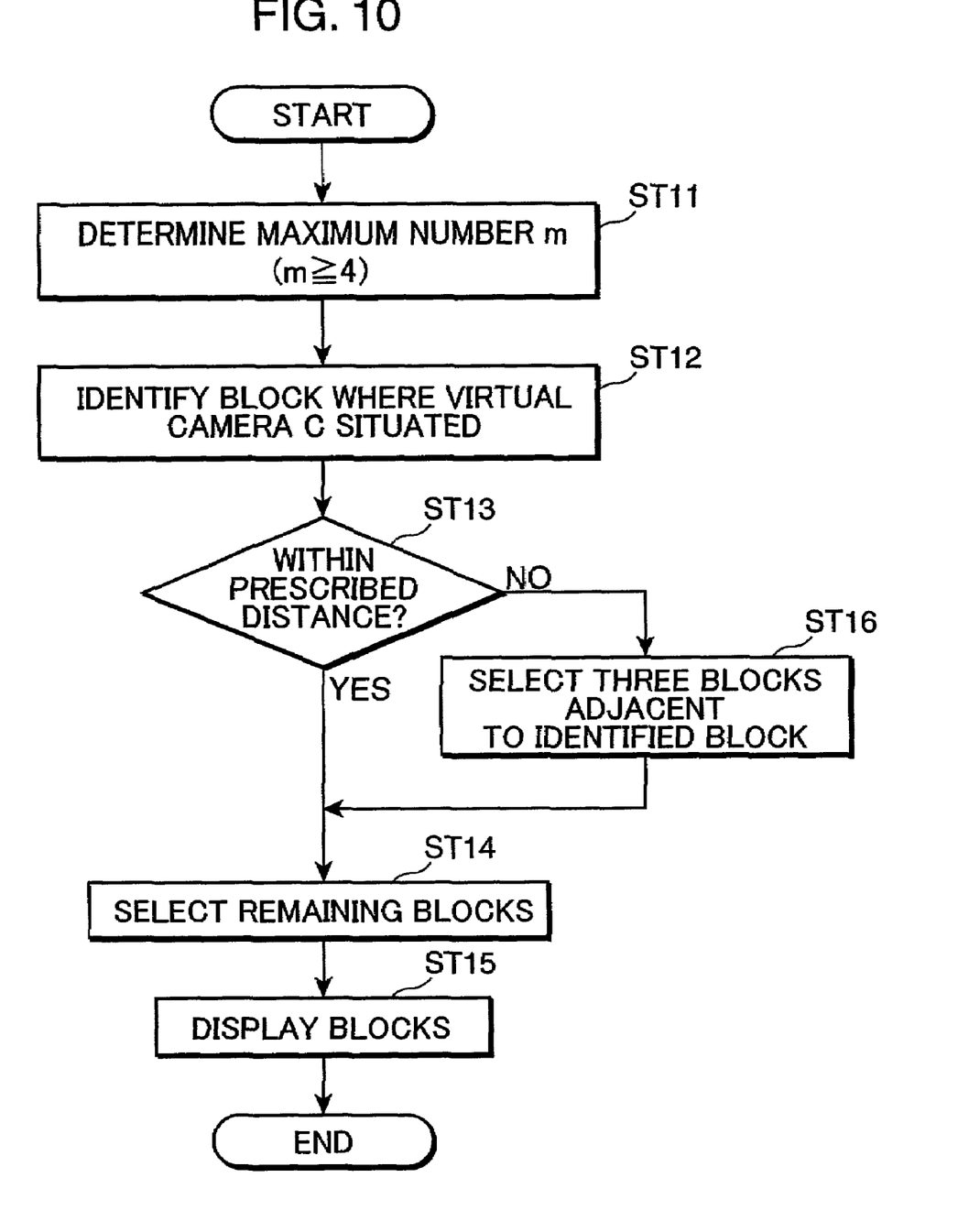
FIG. 10 is a flowchart showing a third selection method in an image display control device.

FIG. 10 is a flowchart of this third selection method.

Firstly the maximum number of identified and selected blocks (m) is decided (m≧4) (ST11). In this case, the number of blocks identified and selected at step ST16 is four, so m is set to m≧4. Next, the block identifying section 112 identifies the block where the virtual camera c is positioned, on the basis of position data from the camera position setting section 111, and it stores the ID of the identified block in the identified block data section 82 (ST12). The block selecting section 113 then proceeds to step ST14 if the virtual camera c is determined to be within a prescribed distance from the centre of the block identified at step ST12, on the basis of the position data from the camera position setting section 111, and it proceeds to step ST16 if the camera is beyond this prescribed distance (ST13). If it is within the prescribed distance, then the block selecting section 113 determines intersection points between the view volume and the remaining blocks, starting from the blocks nearest to the virtual camera c, and it stores a block in the selected block data section 83 if it has such an intersection, repeating this operation until the number of IDs of identified and selected blocks reaches m (ST14). The image processor 12 then reads out the blocks corresponding to the block IDs stored in the identified block data section 82 and selected block data section 83, from the image data section 84, and transfers these blocks to the display area of the RAM 8, from which they are displayed on the monitor (ST15). If the virtual camera c is beyond the prescribed distance, then the block selecting section 113 selects three of the eight blocks adjoining the identified block, on the basis of the position data from the camera position setting section 111, in such a manner that they form a square shape including the block identified at step ST12, and it stores the corresponding block IDs in the selected block data section 83 (ST16). The block selecting section 113 then determines intersection points between the view volume and the remaining blocks, starting from the blocks nearest to the virtual camera c, and stores a block in the selected block data section 83 if it has such an intersection, repeating this operation until the number of IDs of identified and selected blocks reaches m (ST14). The image processor 12 then reads out the blocks corresponding to the block IDs stored in the identified block data section 82 and selected block data section 83, from the image data section 84, and transfers these blocks to the display area of the RAM 8, from which they are displayed on the monitor (ST15).

Summing up the aforementioned descriptions, one of the aspects of the present invention relates to a computer-readable recording medium recording an image display control program for performing control whereby a virtual three-dimensional space consisting of a plurality of three-dimensional models is divided into a grid shape, and the three-dimensional models in the field of view of a virtual camera positioned in the virtual three-dimensional space are transferred to a display memory, with respect to image data of three-dimensional models stored for each block thus divided, and are then displayed on a monitor, the image display control program comprising the steps of: identifying said block where said virtual camera is positioned; selecting either three or five mutually adjoining blocks from the blocks adjoining the periphery of the identified block on the basis of at least one of the position information or line of sight direction information for said virtual camera; reading out the image data for the three-dimensional models in said identified block and selected blocks; and transferring said image data to a display memory. According to the aforementioned aspect of the invention, it is possible to display a large region in a virtual three-dimensional space, without loss of image within the display region, especially in the proximity of the virtual camera.

In the computer-readable recording medium, the number of blocks selected from the blocks adjoining the periphery of said identified block can be set to five. With the above feature, it is possible to display five blocks adjoining the block where the virtual camera is positioned.

In addition, in the aforementioned computer-readable recording medium, the number of blocks selected from the blocks adjoining the periphery of said identified block can be set to three. With the above feature, it is possible to display three blocks adjoining the block where the virtual camera is positioned.

In the computer readable recording medium, blocks intersecting with the line of sight direction of said virtual camera, and blocks adjoining said blocks, are to be selected. With the above described feature, it is possible even to display blocks that are distance from the virtual camera.

Moreover, in the computer readable recording medium, the corner section of said identified block to which said virtual camera is closest is preferably detected, and blocks contacting the detected corner section are selected. With the above described feature, there is no loss of image in the display region, within the range of the block where the virtual camera is positioned.

Another aspect of the present invention relates to a computer-readable recording medium recording an image display control program for performing control whereby a virtual three-dimensional space consisting of a plurality of three-dimensional models is divided into a grid shape, and the three-dimensional models in the field of view of a virtual camera positioned in the virtual three-dimensional space are transferred to a display memory, with respect to image data of three-dimensional models stored for each block thus divided, and are then displayed on a monitor, wherein the image display control program comprising the steps of: identifying said block where said virtual camera is positioned; determining whether or not said virtual camera is positioned within a prescribed range from the centre of the identified block; transferring image data for the three-dimensional models in said identified block to the display memory if the virtual camera is within the prescribed range; and detecting the corner section of said identified block to which said virtual camera is nearest, selecting three blocks contacting the detected corner section, reading out the image data for the three-dimensional models in said identified block and selected blocks, and transferring said image data to the display memory if the virtual camera is beyond the prescribed range. According to the aforementioned aspect of the invention, unnecessary display of adjoining blocks is reduced, and a larger number of blocks can be selected, whereby even distant blocks can be displayed.

Still another aspect of the invention relates to an image display control device having storing means for dividing a virtual three-dimensional space consisting of a plurality of three-dimensional models into a grid shape and storing image data for the three-dimensional models for each block thus divided, which performs controls whereby the three-dimensional models within the field of view of a virtual camera situated in the virtual three-dimensional space are transferred to a display memory, and are then displayed on a monitor, wherein the image display control device comprising: identifying means for identifying said block where said virtual camera is positioned; selecting means for selecting either three or five mutually adjoining blocks from the blocks adjoining the periphery of the identified block, on the basis of at least one of the position information or line of sight direction information for said virtual camera; and image processing means for reading out the image data for the three-dimensional models in said identified block and selected blocks from said storing means and transferring same to a display memory. According to the above-described aspect of the invention, it is possible to display a large region in a virtual three-dimensional space, without loss of image within the display region, especially in the proximity of the virtual camera.

In the aforementioned image display control device, wherein said selecting means preferably selects either three or five mutually adjoining blocks. With the above feature, it is possible to provide a display without loss of image within the display region, especially in the proximity of the virtual camera.

In the image display control device, said selecting means preferably comprises: determining means for determining whether or not said virtual camera is positioned within a prescribed range from the centre of said identified block; display means for transferring image data for three-dimensional models within said identified block to a monitor, if the virtual camera is within the prescribed range; and detecting means for detecting the corner section of said identified block to which said virtual camera is nearest and extracting means for selecting three blocks contacting the detected corner region, if the virtual camera is beyond said prescribed range. With the above feature, unnecessary display of adjoining blocks is reduced, and a larger number of blocks can be selected, whereby even distant blocks can be displayed.

Furthermore, another aspect of the present invention relates to an image display control method performing control whereby a virtual three-dimensional space consisting of a plurality of three-dimensional models is divided into a grid shape, and the three-dimensional models in the field of view of a virtual camera positioned in the virtual three-dimensional space are transferred to a display memory, with respect to image data of three-dimensional models stored for each block thus divided, and are then displayed on a monitor, wherein the image display control method comprising the steps of: identifying said block in which said virtual camera is positioned; selecting either three or five mutually adjoining blocks from the blocks adjoining the periphery of the identified block, on the basis of at least one of the position information or line of sight direction information for said virtual camera; and reading out the image data for the three-dimensional models in said identified block and selected blocks; and transferring said image data to a display memory. According to the above-described aspect of the invention, it is possible to display a large region in a virtual three-dimensional space, without loss of image within the display region, especially in the proximity of the virtual camera.

Yet another aspect of the present invention relates to an image display control method performing control whereby a virtual three-dimensional space consisting of a plurality of three-dimensional models is divided into a grid shape, and the three-dimensional models in the field of view of a virtual camera positioned in the virtual three-dimensional space are transferred to a display memory, with respect to image data of three-dimensional models stored for each block thus divided, and are then displayed on a monitor, wherein the image display control method comprising the steps of: identifying said block in which said virtual camera is positioned; determining whether or not said virtual camera is positioned within a prescribed range from the centre of the identified block; transferring image data for the three-dimensional models in said identified block to the display memory, if the virtual camera is within the prescribed range; and detecting the corner section of said identified block to which said virtual camera is nearest, selecting three blocks contacting the detected corner section, and reading out the image data for the three-dimensional models in said identified block and selected blocks and transferring same to the display memory if the virtual camera is beyond the prescribed range. According to the aforementioned aspect of the invention, unnecessary display of adjoining blocks is reduced, and a larger number of blocks can be selected, whereby even distant blocks can be displayed.

This application is based on Japanese Patent Application serial No. 2000-362571 filed in Japanese Patent Office on Nov. 29, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modification depart from the scope of the present invention hereinafter defined, they should be construed as being included therein.

What is claimed is:

1. A computer-readable recording medium recording an image display control program for performing control whereby a virtual three-dimensional space consisting of a plurality of three-dimensional models is divided into a grid shape, and the three-dimensional models in the field of view of a virtual camera positioned in the virtual three-dimensional space are transferred to a display memory, with respect to image data of three-dimensional models stored for each block thus divided, and are then displayed on a monitor, the image display control program comprising the steps of:

identifying said block where said virtual camera is positioned;

selecting either three or five mutually adjoining blocks from the blocks adjoining the periphery of the identified block on the basis of at least one of the position information and line of sight direction information for said virtual camera;

reading out the image data for the three-dimensional models in said identified block and selected blocks; and transferring said image data to a display memory.

2. The computer-readable recording medium according to claim 1, wherein the number of blocks selected from the blocks adjoining the periphery of said identified block is five.

3. The computer-readable recording medium according to claim 1, wherein the number of blocks selected from the blocks adjoining the periphery of said identified block is three.

4. The computer readable recording medium according to claim 3, wherein blocks intersecting with the line of sight direction of said virtual camera, and blocks adjoining said blocks, are selected.

5. The computer readable recording medium according to claim 4, wherein the corner section of said identified block to which said virtual camera is closest is detected, and blocks contacting the detected corner section are selected.

6. A computer-readable recording medium recording an image display control program for performing control whereby a virtual three-dimensional space consisting of a plurality of three-dimensional models is divided into a grid shape, and the three-dimensional models in the field of view of a virtual camera positioned in the virtual three-dimensional space are transferred to a display memory, with respect to image data of three-dimensional models stored for each block thus divided, and are then displayed on a monitor, the image display control program comprising the steps of:
identifying said block where said virtual camera is positioned;
determining whether or not said virtual camera is positioned within a prescribed range from the centre of the identified block;
transferring image data for the three-dimensional models in said identified block to the display memory if the virtual camera is within the prescribed range; and
detecting the corner section of said identified block to which said virtual camera is nearest, selecting three blocks contacting the detected corner section, reading out the image data for the three-dimensional models in said identified block and selected blocks, and transferring said image data to the display memory if the virtual camera is beyond the prescribed range.

7. An image display control device having storing means for dividing a virtual three-dimensional space consisting of a plurality of three-dimensional models into a grid shape and storing image data for the three-dimensional models for each block thus divided, which performs controls whereby the three-dimensional models within the field of view of a virtual camera situated in the virtual three-dimensional space are transferred to a display memory, and are then displayed on a monitor, the image display control device comprising:
identifying means for identifying said block where said virtual camera is positioned;
selecting means for selecting either three or five mutually adjoining blocks from the blocks adjoining the periphery of the identified block, on the basis of at least one of the position information and line of sight direction information for said virtual camera; and
image processing means for reading out the image data for the three-dimensional models in said identified block and selected blocks from said storing means and transferring the image data to a display memory.

8. The image display control device according to claim 7, wherein said selecting means selects either three or five mutually adjoining blocks.

9. The image display control device according to claim 7, wherein said selecting means comprises:
determining means for determining whether or not said virtual camera is positioned within a prescribed range from the centre of said identified block;
display means for transferring image data for three-dimensional models within said identified block to a monitor, if the virtual camera is within the prescribed range; and
detecting means for detecting the corner section of said identified block to which said virtual camera is nearest and extracting means for selecting three blocks contacting the detected corner region, if the virtual camera is beyond said prescribed range.

10. An image display control method performing control whereby a virtual three-dimensional space consisting of a plurality of three-dimensional models is divided into a grid shape, and the three-dimensional models in the field of view of a virtual camera positioned in the virtual three-dimensional space are transferred to a display memory, with respect to image data of three-dimensional models stored for each block thus divided, and are then displayed on a monitor, the image display control method comprising the steps of:
identifying said block in which said virtual camera is positioned;
selecting either three or five mutually adjoining blocks from the blocks adjoining the periphery of the identified block, on the basis of at least one of the position information and line of sight direction information for said virtual camera; and
reading out the image data for the three-dimensional models in said identified block and selected blocks; and transferring said image data to a display memory.

11. An image display control method performing control whereby a virtual three-dimensional space consisting of a plurality of three-dimensional models is divided into a grid shape, and the three-dimensional models in the field of view of a virtual camera positioned in the virtual three-dimensional space are transferred to a display memory, with respect to image data of three-dimensional models stored for each block thus divided, and are then displayed on a monitor, the image display control method comprising the steps of:
identifying said block in which said virtual camera is positioned;
determining whether or not said virtual camera is positioned within a prescribed range from the centre of the identified block;
transferring image data for the three-dimensional models in said identified block to the display memory, if the virtual camera is within the prescribed range; and
detecting the corner section of said identified block to which said virtual camera is nearest, selecting three blocks contacting the detected corner section, and reading out the image data for the three-dimensional models in said identified block and selected blocks and transferring same to the display memory if the virtual camera is beyond the prescribed range.

* * * * *